United States Patent [19]
Doi et al.

[11] Patent Number: 5,786,959
[45] Date of Patent: Jul. 28, 1998

[54] RECORDING AND/OR REPRODUCING APPARATUS WITH ROTARY DRUM UNIT

[75] Inventors: Junichi Doi, Tokyo; Takeshi Kawabe, Kanagawa-ken, both of Japan

[73] Assignee: Canon Kabushiki Kaisha, Tokyo, Japan

[21] Appl. No.: 902,475

[22] Filed: Jul. 29, 1997

Related U.S. Application Data

[63] Continuation of Ser. No. 509,198, Jul. 31, 1995, abandoned.

[30] Foreign Application Priority Data

Aug. 6, 1994 [JP] Japan .................................. 6-204616

[51] Int. Cl.$^6$ ............................................. G11B 15/61
[52] U.S. Cl. .................. 360/85; 360/130.23; 360/130.24
[58] Field of Search ........................... 360/83, 84, 85, 360/107, 130.2, 130.21, 130.22, 130.23, 130.24

[56] References Cited

U.S. PATENT DOCUMENTS

| | | | |
|---|---|---|---|
| 4,580,180 | 4/1986 | Murakoshi | 360/84 |
| 4,891,726 | 1/1990 | Suwa et al. | 360/130.23 |
| 5,395,067 | 3/1995 | Kano et al. | 360/130.23 |
| 5,438,468 | 8/1995 | Hasegawa et al. | 360/107 |

FOREIGN PATENT DOCUMENTS

| | | | |
|---|---|---|---|
| 59-79454 | 5/1984 | Japan | 360/130.24 |
| 59-151305 | 8/1984 | Japan | 360/130.24 |
| 4289549 | 10/1992 | Japan | 360/130.24 |
| 5342714 | 12/1993 | Japan | 360/130.24 |
| 2088115 | 6/1982 | United Kingdom | 360/130.23 |

*Primary Examiner*—Stuart S. Levy
*Assistant Examiner*—David L. Ometz
*Attorney, Agent, or Firm*—Robin, Blecker & Daley

[57] ABSTRACT

An apparatus for recording and/or reproducing information on or from a tape includes a rotary drum unit having a rotary drum which has at least one head and a fixed drum which is arranged to rotatably support the rotary drum, and a loading member arranged to wrap the tape around the outer circumferential surfaces of the rotary drum and the fixed drum. The rotary drum unit is arranged such that, at a tape wrapping start point where the tape begins to be wrapped around the rotary drum, an upper end part of the rotary drum is located between an upper edge of the tape at the tape wrapping start point and an end part of a recording track formed as an effective signal recording area on the tape.

18 Claims, 4 Drawing Sheets

RECORDING AND/OR REPRODUCING APPARATUS WITH ROTARY DRUM UNIT

This is a continuation application under 37 CFR 1.62 of prior application Ser. No. 08/509,198, filed Jul. 31, 1995, now abandoned.

BACKGROUND OF THE INVENTION

1. Field of the Invention

This invention relates to a recording and/or reproducing apparatus, such as a VTR or the like, wherein a rotary drum unit is arranged to have a tape helically wrapped around a rotary drum on which a head is mounted.

2. Description of the Related Art

A structural arrangement whereby a chassis which is provided with a reel mount for loading a tape cassette is arranged to be slidable toward a rotary drum unit mounted on another chassis in loading, for example, a VTR with a tape cassette has recently come to be adopted for the purpose of reducing the size of the VTR.

FIGS. 7 and 8 are a plan view and a side view showing in outline the above-stated structural arrangement of a VTR. Referring to FIGS. 7 and 8, a rotary drum unit 1 consists of a rotary upper drum 12 which is provided with a rotary head 11 and a fixed lower drum 14 which has a tape lead (guiding) part 13. The upper and lower drums 12 and 14 are coaxially arranged. The rotary drum unit 1 is mounted aslant on a main chassis 2. Tape guides 3 and 4 for tape loading and a fixed head 5 are disposed on the main chassis 2.

A sub-chassis 6 is arranged on the main chassis 2 to be slidable back and forth over the main chassis 2. A reel mount 7 is arranged on the sub-chassis 6 to have a tape cassette 8 mounted on the reel mount 7.

After the tape cassette 8 is mounted on the reel mount 7, the sub-chassis 6 is slid toward the rotary drum unit 1. A part of the rotary drum unit 1 is inserted into an opening part 81 of the tape cassette 8 by the sliding motion. With the part of the rotary drum unit 1 inserted into the tape cassette 8, a tape 82 is pulled out from inside of the tape cassette 8 by the tape guides 3 and 4, etc. The tape 82 then comes under the restriction of a tape lead part 13 to be wrapped around the circumferential surfaces of the rotary drum 12 and the fixed drum 14. A tape path is thus formed in a predetermined state. A recording or reproducing operation is carried out as desired by means of the rotary head 11 and the fixed head 5 with the tape 82 caused to travel.

With the conventional VTR arranged in the above-stated manner to cause the sub-chassis 6 to slide toward the rotary drum unit 1 in loading the VTR with a tape, however, an attempt to have the rotary drum unit inserted deeper into the opening part 81 of the tape cassette 1 by increasing the sliding extent of the sub-chassis 6 for the purpose of reducing the size of the VTR encounters a problem with respect to a clearance "a" between the upper front end part 83 of the tape cassette 8 and the upper end edge 12a of the rotary drum 12. In this case, the position of the rotary drum unit 1 as a whole must be set to be lower relative to the position of the tape cassette 8. As a result of that, a difference in vertical position between the tape pulled out from the tape cassette 8 and the circumferential surfaces of the drums (positions in the direction of the thickness of the tape cassette 8) becomes larger to make the tape path complex.

SUMMARY OF THE INVENTION

This invention is directed to the solution of the above-stated problem. It is, therefore, an object of this invention to provide a rotary drum unit which is arranged to permit reduction in height of a rotary drum without bringing about any possibility of damaging the tape and also a recording and/or reproducing apparatus which includes this rotary drum unit and is arranged to be capable of forming a simple tape path and thus to permit the reduction of its size.

To attain this object, an apparatus for recording and/or reproducing information on or from a tape includes: a rotary drum unit including a rotary drum having at least one head, and a fixed drum arranged to rotatably support the rotary drum; and a loading member arranged to wrap the tape around outer circumferential surfaces of the rotary drum and the fixed drum. The rotary drum unit is arranged such that, at a tape wrapping start point where the tape begins to be wrapped around the rotary drum, an upper end part of the rotary drum is located between an upper edge of the tape at the tape wrapping start point and an end part of a recording track formed as an effective signal recording area on the tape.

The above and other objects and features of this invention will become apparent from the following detailed description of a preferred embodiment thereof taken in connection with the accompanying drawings.

DETAILED DESCRIPTION OF THE PREFERRED EMBODIMENT

Figure 1:
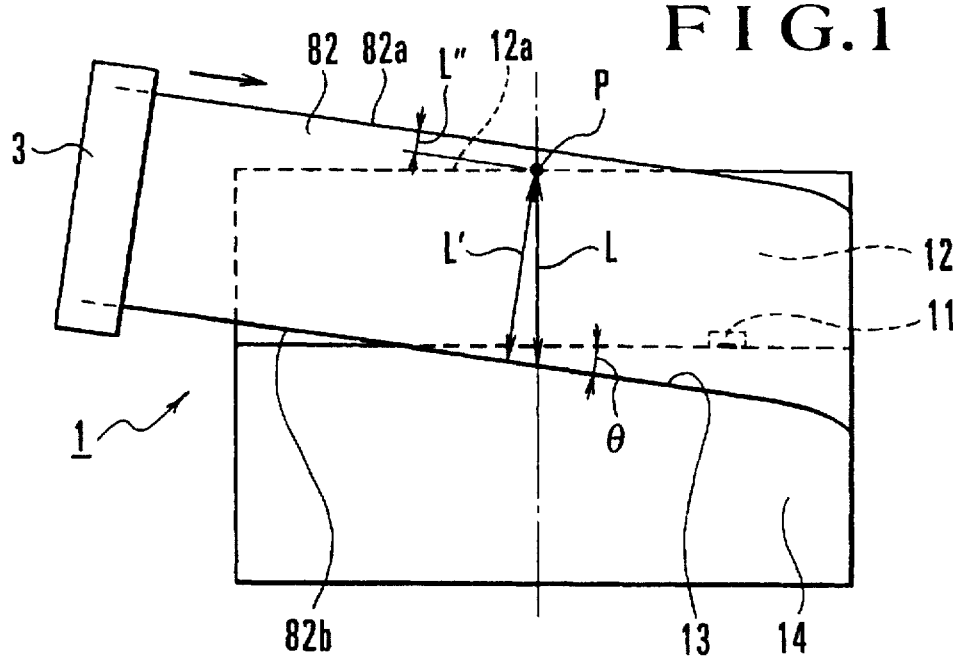
FIG. 1 is a side view of a rotary drum unit of a VTR which is an embodiment of this invention, showing a part where a tape begins to be wrapped around a rotary drum and a fixed drum of the rotary drum unit of the VTR.
Figure 2:
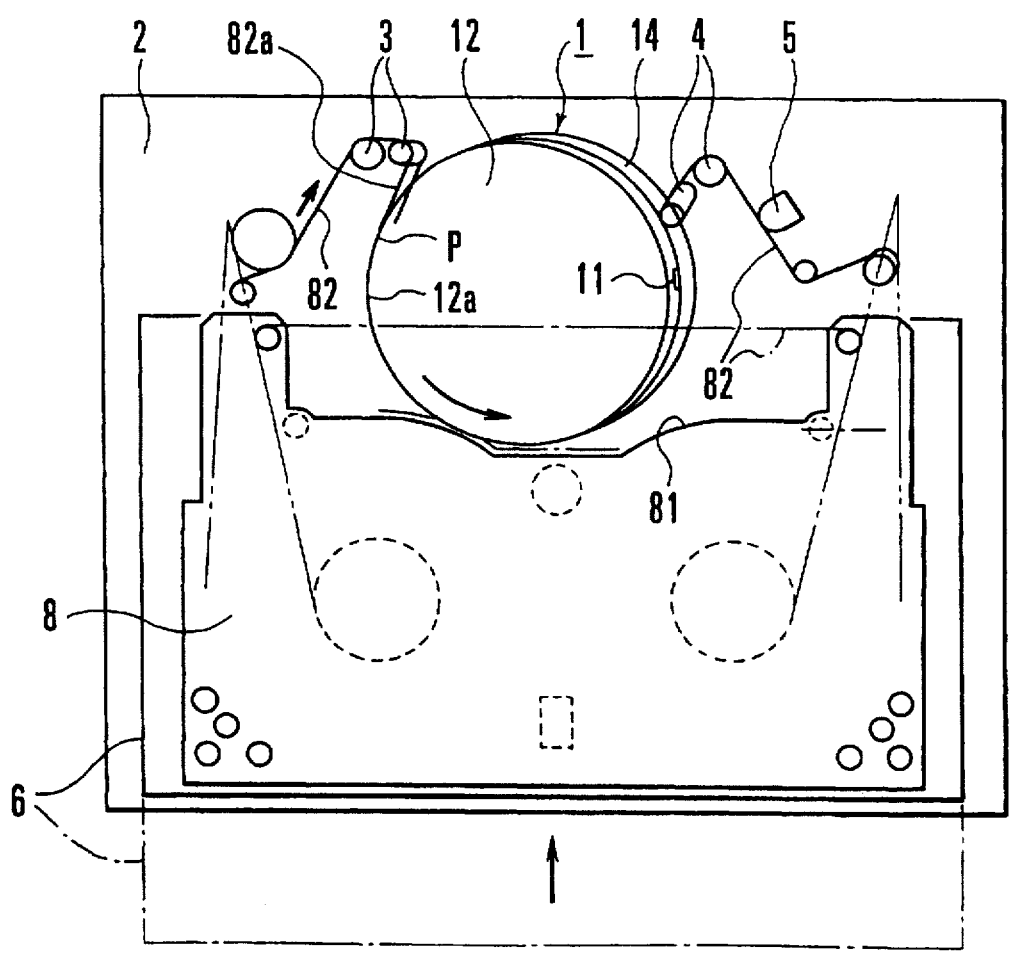
FIG. 2 is a plan view showing in outline the VTR of the same embodiment of this invention.
Figure 3:
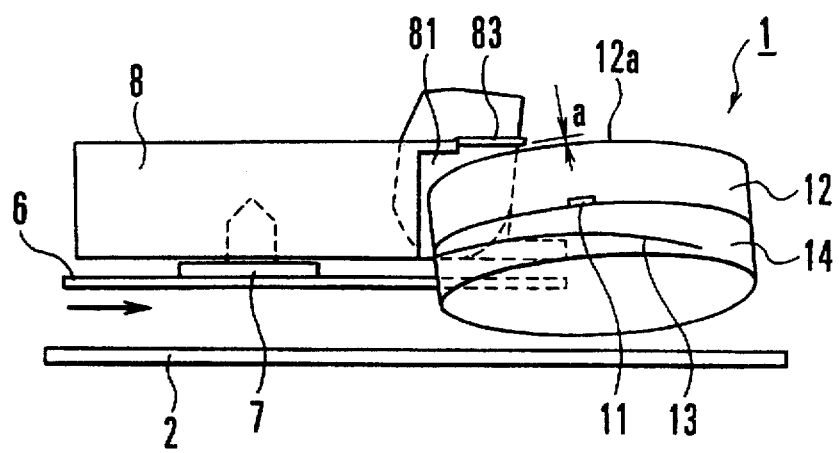
FIG. 3 is a side view showing in outline the VTR of the same embodiment of this invention.

An embodiment of this invention wherein a rotary drum unit which is arranged according to this invention and a recording and/or reproducing apparatus which includes the rotary drum unit are applied to an 8-mm VTR is described with reference to FIGS. 1 to 6 as follows. FIG. 1 is a side view of the rotary drum unit, showing a tape wrapping start part where the tape begins to be wrapped around a rotary drum and a fixed drum. FIG. 2 is a plan view showing in outline the arrangement of the VTR. FIG. 3 is a side view showing the VTR.

In FIGS. 2 and 3, all parts of the embodiment that are substantially the same as those of the conventional rotary drum unit described in the foregoing are shown by the same reference numerals and are omitted from the following description. In the case of the embodiment of this invention, the rotary drum 12 is arranged to have a lower height and the sub-chassis 6 to have a larger sliding extent.

An attempt to arrange the rotary drum unit 1 to be inserted deeper into the opening part 81 of the tape cassette 8 by increasing the sliding extent of the sub-chassis 6 in an M-shaped parallel loading arrangement, as shown in FIGS. 2 and 3, encounters a problem with respect to a clearance "a" between the upper front end part 83 of the tape cassette 8 and the upper end edge 12a of the rotary drum 12, as mentioned in the foregoing.

To solve this problem, it is necessary to reduce the height of the rotary drum 12 without setting the whole rotary drum unit 1 in a lower position. In this instance, as shown in FIG. 1, at a tape wrapping start point P where the tape 82 begins to be wrapped around the rotary drum 12, the upper end edge 12a of the rotary drum 12 comes into contact with the tape 82 at a position lower than the upper edge 82a of the tape 82.

Figure 4A:
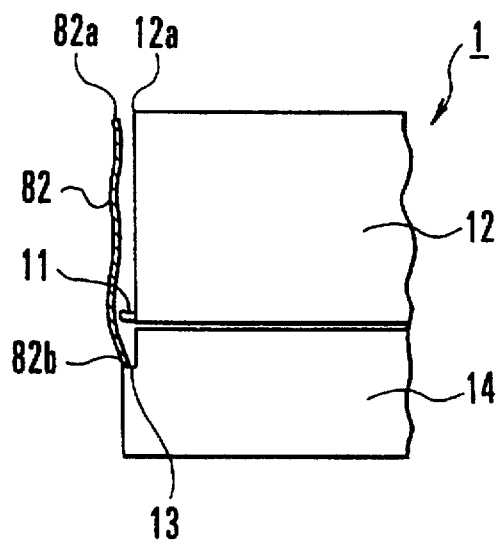
FIGS. 4(a) and 4(b) show in side views different states of an air film obtained in a part where a tape begins to be wrapped, FIG. 4(a) showing the air film as obtained with the upper end edge of the rotary drum located higher than the upper edge of the tape and FIG. 4(b) showing the air film as obtained with the upper end edge of the rotary drum located lower than the upper edge of the tape.
Figure 4B:
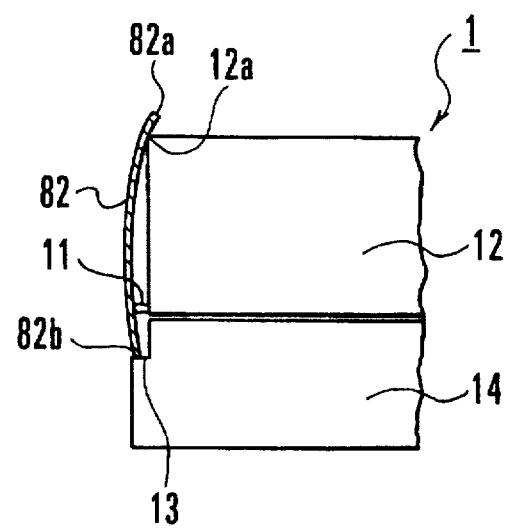

FIGS. 4(a) and 4(b) are side views showing the states of the film obtained at the tape wrapping start part. In the case of the conventional arrangement, the upper end edge 12a of the rotary drum 12 is located above the upper edge 82a of the tape 82, and the tape 82 is as a whole held in a buoyed-up state by an air film as shown in FIG. 4(a). On the other hand, in a case where the upper end edge 12a of the rotary drum 12 is arranged to be lower than the upper edge 82a of the tape 82, as shown in FIG. 4(b), the air film is not stable and does not hold the upper edge 82a of the tape 82. The air film thus allows the upper end edge 12a of the rotary drum 12 to be in contact with a magnetic surface of the tape 82.

Figure 5:
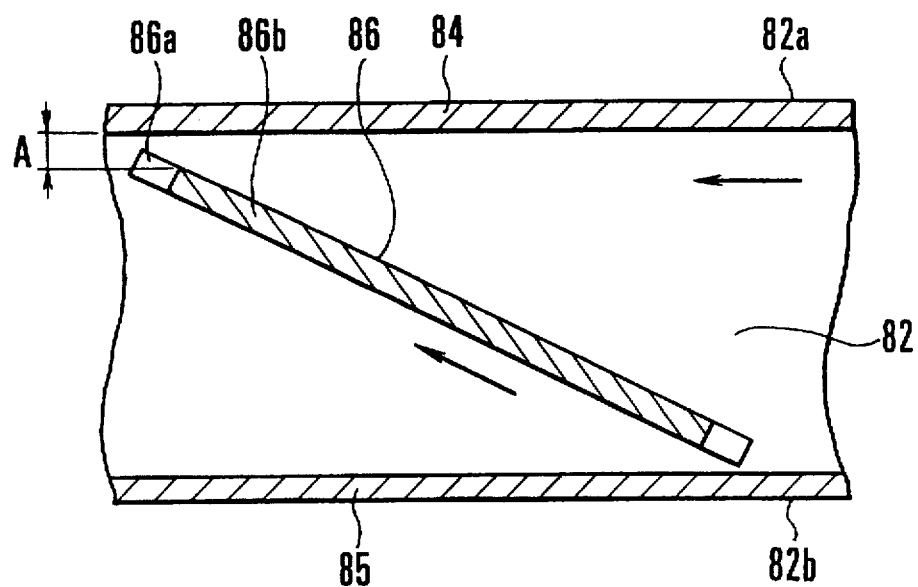
FIG. 5 shows a recording pattern obtained by the same embodiment in conformity with an 8-mm video format.

FIG. 5 shows a recording pattern formed on the tape 82 in conformity with an 8-mm video format. The magnetic surface of the tape 82 includes linear track areas 84 and 85 which are provided along the upper and lower edges of the tape for recording by the fixed head 5. A helical track area 86 which is located between the linear track areas 84 and 85 is provided for recording by the rotary head 11.

The upper end edge 12a of the rotary drum 12 at the tape wrapping start point P is made to be located within a range A between the upper linear track area 84 and an effective signal recording part 86b of the helical track area 86 obtained by excluding an upper overlapping area 86a from the area 86.

Figure 6:
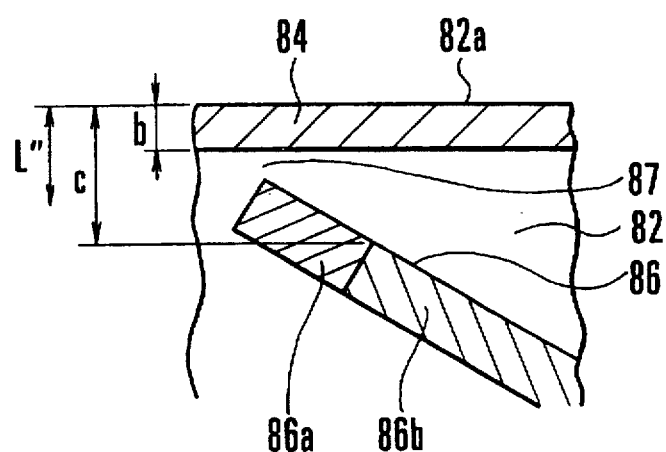
FIG. 6 is an enlarged view showing dimensions of a track pattern obtained in an upper edge part of a tape by the same embodiment of this invention.
Figure 7:
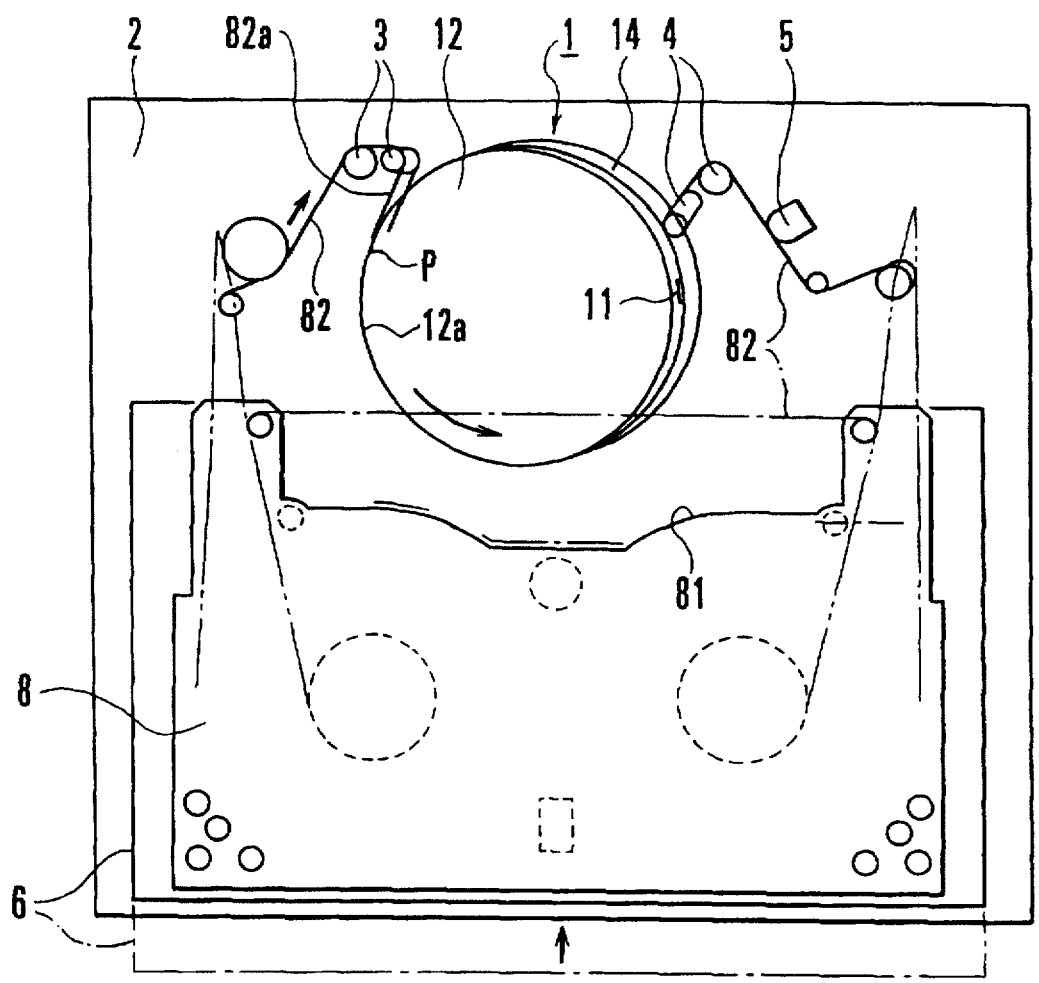
FIG. 7 is a plan view showing in outline the arrangement of the conventional VTR.
Figure 8:
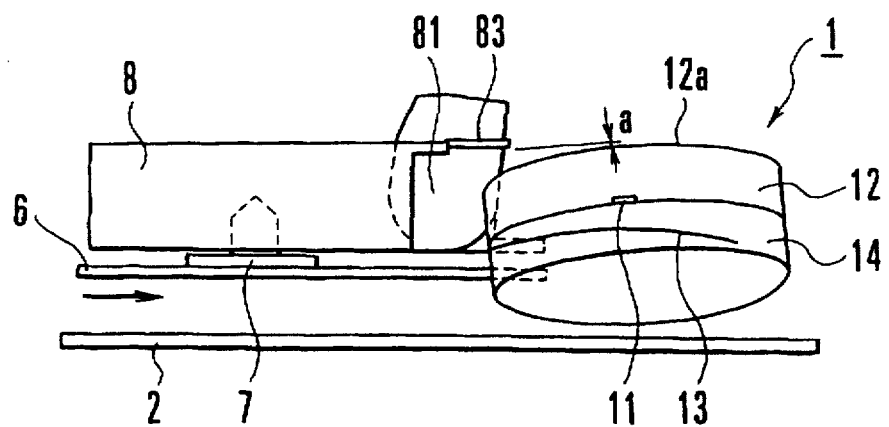
FIG. 8 is a side view showing in outline the arrangement of the conventional VTR.

FIG. 6 is an enlarged view showing the size of a track pattern obtained at the upper edge part of the tape. The width "b" of the linear track area 84 which begins from the upper edge 82a of the tape 82 measures 0.6±0.05 mm while a width "c" which is from the upper edge 82a to the uppermost part of the effective signal recording part 86b of the helical track area 86 measures 0.85 mm.

The upper end edge 12a of the rotary drum 12 is arranged to be located within a part consisting of the overlapping part 86a which is located above the uppermost part of the effective signal recording part 86b and a guard band 87 extending from the overlapping part 86a to the linear track area 84. In other words, a length (of distance) L" (mm) from the upper edge 82a of the tape 82 to the upper end edge 12a of the rotary drum 12 is set at a value of 0.65<L"<0.85.

FIG. 1 shows these positions including the rotary drum 12 and the fixed drum 14. Referring to FIG. 1, assuming that a height from the lower edge 82b of the tape 82, i.e., the tape lead part 13, to the upper end edge 12a of the rotary drum 12 is L' (mm), the height L' can be expressed as 7.15<L'<7.35.

According to the 8-mm VTR format, the lead angle θ of the tape lead part 13 is 4.885°. Therefore, with this inclination taken into consideration, a height L (mm) in the direction of the axis of the drum from the tape lead part 13 to the upper end edge 12a of the rotary drum 12 is expressed as L=L'/cos θ and becomes 7.18<L<7.38.

As described above, in the rotary drum unit 1 of this embodiment, the upper end edge 12a of the rotary drum 12 is set in an optimum position to permit reduction in height of the rotary drum 12. Besides, even if the magnetic surface of the tape 82 happens to be damaged by the upper end edge 12a of the rotary drum 12, the damaged part is located outside the recording track, so that the quality of video images and that of sounds are effectively prevented from being affected by the damage.

Strictly speaking, the upper end edge 12a of the rotary drum 12 is normally machined into a sectional shape called a C surface which slants at an angle of 45° relative to the outer circumferential surface of the rotary drum 12 or into a curved surface called an R surface. When this machined part comes into contact with the tape 82, the contact part can be considered to be substantially representing the upper end edge 12a.

The VTR having the rotary drum unit 1 including the rotary drum 12 which has the reduced height, as mentioned above, can be arranged to be capable of inserting the rotary drum unit 1 deeper into the opening part 81 of the tape cassette 8, by increasing the sliding extent of the sub-chassis 6 without causing the upper end edge 12a of the rotary drum 12 to interfere with the upper front end 83 of the tape cassette 8, so that the VTR can be more compactly arranged. Further, since it is not necessary to set the whole rotary drum unit 1 in a lower position relative to the tape cassette 8, the difference in vertical position between the tape cassette 8 and the circumferential drum surface can be lessened. Therefore, in accordance with the arrangement of this embodiment, a simpler tape path can be arranged, for example, for the M-shaped parallel tape loading.

While one embodiment of this invention has been described, this invention is not limited to the specific embodiment described. Various changes and modifications of the arrangement of the embodiment described are possible on the basis of the technological concept of this invention without departing from the spirit and scope thereof. Although the embodiment has been described for an 8-mm VTR and its rotary drum unit, in a case where no linear track area is provided along the upper edge of the tape for recording by the fixed head, for example, the position of the upper end edge of the rotary drum at the point where the tape begins to be wrapped around the drum may be set between the upper edge of the tape and the effective signal recording part of the helical track area provided for recording by the rotary head.

What is claimed is:

1. An apparatus for recording and/or reproducing information on or from a tape, comprising:

a) a rotary drum, unit including a rotary drum having at least one head, and a fixed drum arranged to rotatably support said rotary drum; and b) a loading member arranged to wrap the tape around outer circumferential surfaces of said rotary drum and said fixed drum, wherein, at a tape wrapping start point where the tape begins to be wrapped around said rotary drum, an upper end part of said rotary drum is located between an upper edge of the tape at the tape wrapping start point and an upper end part, closest said upper edge of the tape, of a recording track formed as an effective signal recording area on the tape.

2. An apparatus according to claim 1, wherein the upper end part of said rotary drum at the tape wrapping start point is located at a position between a position at a distance of a predetermined length from the upper edge of the tape at the tape wrapping start point and the end part of the recording track.

3. An apparatus according to claim 2, wherein said fixed drum has a lead part arranged to guide the tape by coming into contact with a lower edge of the tape.

4. An apparatus according to claim 3, wherein a length L (mm) from the lead part of said fixed drum to the upper end part of said rotary drum at the tape wrapping start point, in the direction of an axis of rotation of said rotary drum, is set as $7.18 < L < 7.38$.

5. An apparatus according to claim 1 or 2, wherein the upper end part of said rotary drum has a chamfered part.

6. An apparatus according to claim 5, wherein said chamfered part is formed into a curved surface.

7. An apparatus according to claim 5, wherein said chamfered part is formed at an angle of about 45 degrees to the circumferential surface of said rotary drum.

8. An apparatus for recording and/or reproducing information on or from a tape contained in a cassette by pulling the tape out from the cassette and by wrapping the tape around a rotary drum, comprising:

a) a first chassis on which said rotary drum is mounted;
   b) a second chassis arranged to be movable relative to said first chassis and having a mount part for mounting the cassette; and
   c) a loading member arranged to cause the tape pulled out from the cassette to be wrapped around said rotary drum and to form a predetermined tape path, wherein, at a tape wrapping start point where the tape begins to be wrapped around said rotary drum, an upper end part of said rotary drum is located between an upper edge of the tape at the tape wrapping start point and an upper end part, closest said upper edge of the tape, of a recording track formed as an effective signal recording area on the tape.

9. An apparatus according to claim 8, wherein the upper end part of said rotary drum at the tape wrapping start point is located at a position between a position at a distance of a predetermined length from the upper edge of the tape at the tape wrapping start point and the end part of the recording track.

10. An apparatus according to claim 9, wherein said fixed drum has a lead part arranged to guide the tape by coming into contact with a lower edge of the tape.

11. An apparatus according to claim 10, wherein a length L (mm) from the lead part of said fixed drum to the upper end part of said rotary drum at the tape wrapping start point, in the direction of an axis of rotation of said rotary drum, is set as $7.18 < L < 7.38$.

12. A rotary drum unit for recording and/or reproducing information on or from a tape by wrapping the tape around an outer circumferential surface of said rotary drum unit, comprising:

a) a rotary drum having at least one head; and
   b) a fixed drum arranged to rotatably support said rotary drum, wherein, at a tape wrapping start point where the tape begins to be wrapped around said rotary drum, an upper end part of said rotary drum is located between an upper edge of the tape at the tape wrapping start point and an upper end part, closest said upper edge of the tape, of a recording track formed as an effective signal recording area on the tape.

13. A rotary drum unit according to claim 12, wherein the upper end part of said rotary drum at the tape wrapping start point is located at a position between a position at a distance of a predetermined length from the upper edge of the tape at the tape wrapping start point and the end part of the recording track.

14. A rotary drum unit according to claim 13, wherein said fixed drum has a lead part arranged to guide the tape by coming into contact with a lower edge of the tape.

15. A rotary drum unit according to claim 14, wherein a length L (mm) from the lead part of said fixed drum to the upper end part of said rotary drum at the tape wrapping start point, in the direction of an axis of rotation of said rotary drum, is set as $7.18 < L < 7.38$.

16. A rotary drum unit according to claim 12 or 13, wherein the upper end part of said rotary drum has a chamfered part.

17. A rotary drum unit according to claim 16, wherein said chamfered part is formed into a curved surface.

18. A rotary drum unit according to claim 16, wherein said chamfered part is formed at an angle of about 45 degrees to the circumferential surface of said rotary drum.

* * * * *

UNITED STATES PATENT AND TRADEMARK OFFICE
CERTIFICATE OF CORRECTION

PATENT NO. : 5,786,959

DATED : July 28, 1998

INVENTOR(S) : Junichi Doi, et al.

It is certified that error appears in the above-identified patent and that said Letters Patent is hereby corrected as shown below:

Col. 4, line 58, after "drum" delete --,--.

Signed and Sealed this

Second Day of February, 1999

Attest:

Attesting Officer

*Acting Commissioner of Patents and Trademarks*